June 10, 1930.  M. B. TARK  1,763,412
SEWAGE DISPOSAL APPARATUS
Filed March 22, 1927   3 Sheets-Sheet 1
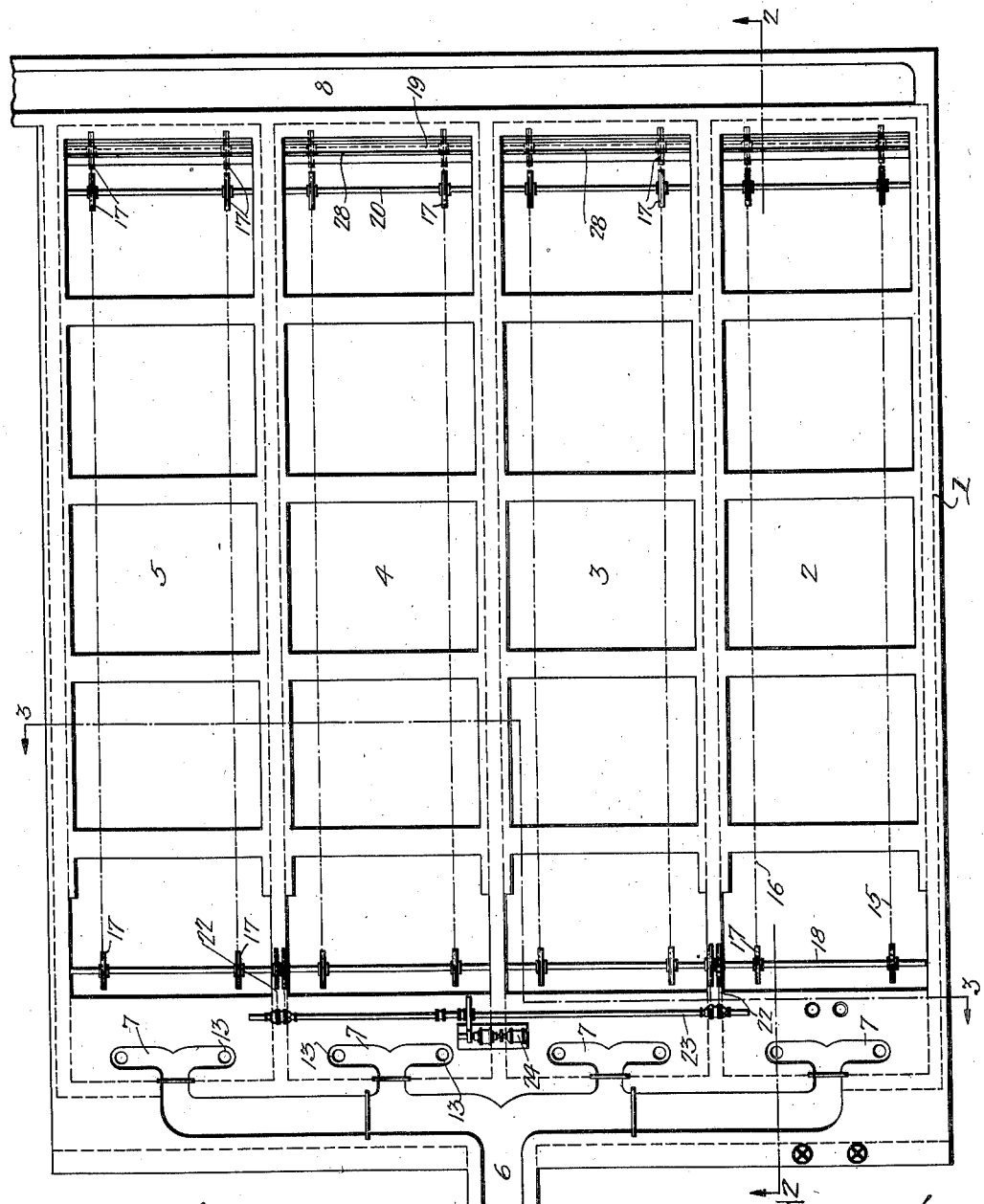

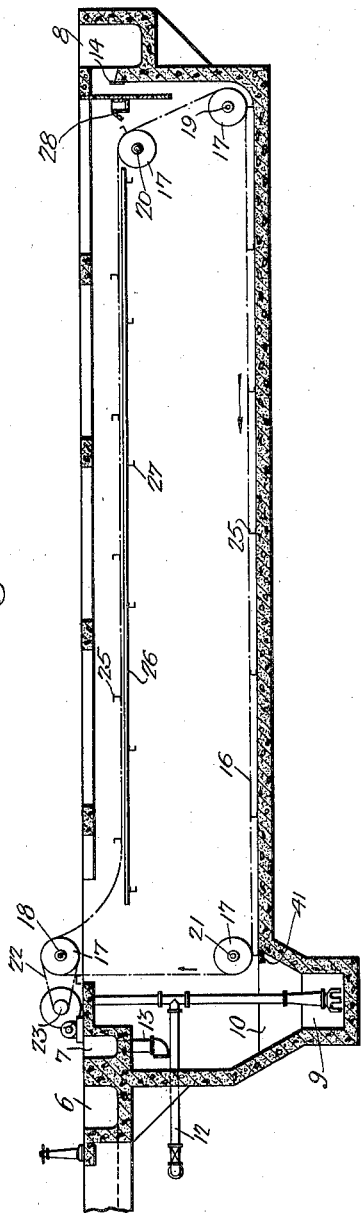
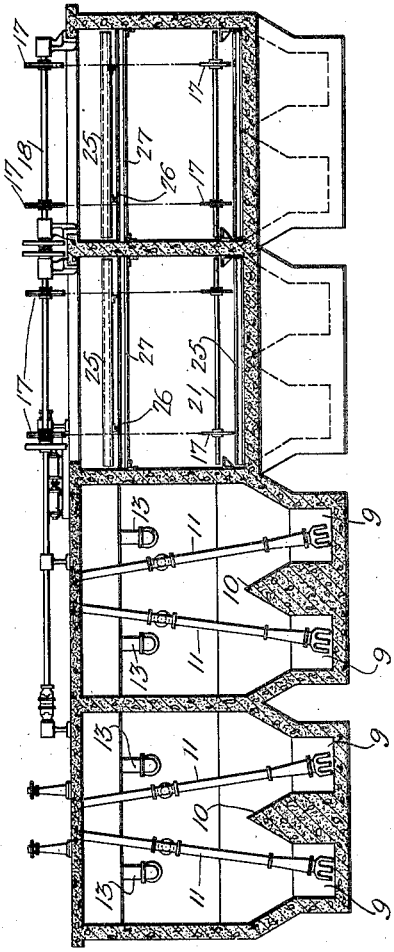

June 10, 1930.  M. B. TARK  1,763,412
SEWAGE DISPOSAL APPARATUS
Filed March 22, 1927   3 Sheets-Sheet 3
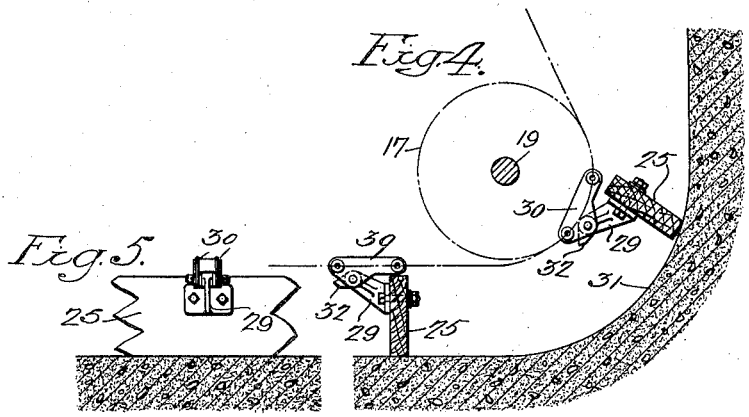
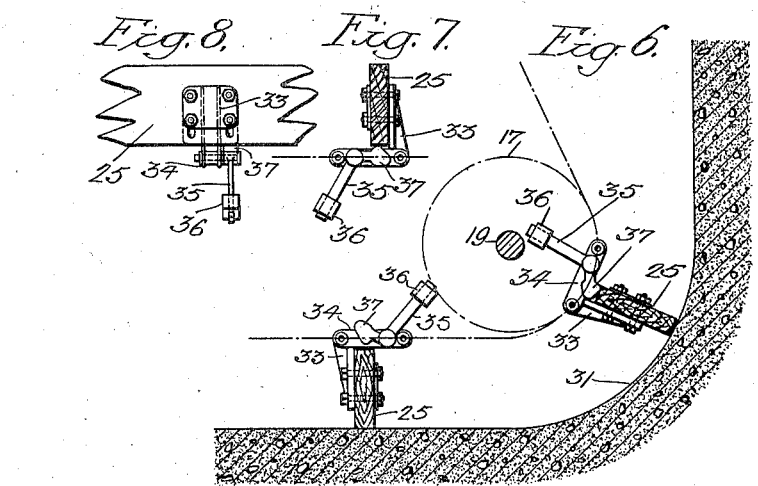
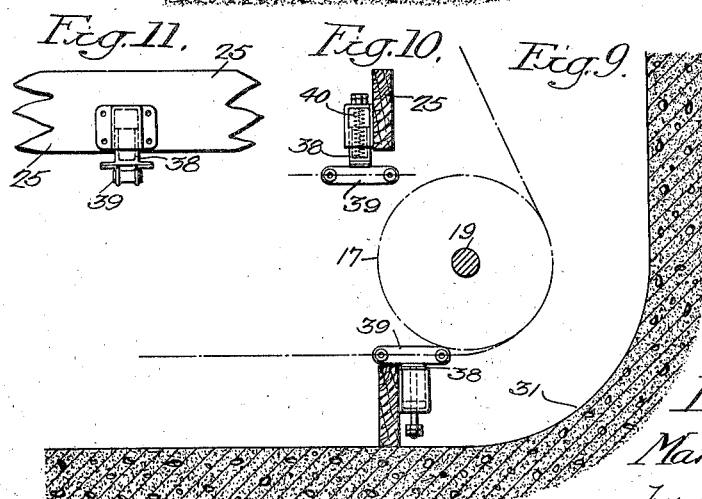

Patented June 10, 1930

1,763,412

UNITED STATES PATENT OFFICE

MARCUS B. TARK, OF PHILADELPHIA, PENNSYLVANIA, ASSIGNOR TO LINK-BELT COMPANY, OF CHICAGO, ILLINOIS, A CORPORATION OF ILLINOIS

SEWAGE-DISPOSAL APPARATUS

Application filed March 22, 1927. Serial No. 177,372.

REISSUED

This invention relates to improvements in sewage disposal apparatus, and has for its principal object the provision of novel and highly advantageous means for removing the precipitated sludge from the sedimentation tanks and accumulations from analogous operations.

Considerable difficulty has been experienced in the past in removing precipitated sludge accumulating in the bottoms of tanks constituting a part of sewage disposal systems, and the present invention contemplates the provision in the tanks of mechanical means for collecting the sludge in suitable chambers or hoppers from which it may be removed by gravity or by means of a pump or other conveyer.

The invention further comprehends certain novel structural features of the mechanical sludge-collecting means and of the tanks in which they operate, whereby the operation of the said collecting means and the apparatus as a whole is made highly efficient.

A further novel feature of the invention resides in the provision of means for collecting and removing scum, grease and oil from the surface of the liquid in the tanks.

A further and more specific object of the invention is the provision in the collecting mechanism of means adapting the operation thereof to the more or less irregular surfaces of concrete tanks in which they may be used.

In the attached drawings:

Figure 1 is a plan view of a sediment tank made in accordance with my invention;

Fig. 2 is a longitudinal section on the line 2—2, Fig. 1;

Fig. 3 is a transverse section on the line 3—3, Fig. 1;

Fig. 4 is a fragmentary sectional enlargement showing the effluent end of the tank and illustrating details of the mechanical collector;

Fig. 5 is a fragmentary elevation of one of the flights forming a part of the collector;

Fig. 6 is a view similar to Fig. 4, but illustrating a modification in the construction of the collector;

Fig. 7 is an end elevation of one of the flights illustrating details of the collector construction shown in Fig. 6;

Fig. 8 is a fragmentary front elevation of the flight shown in Fig. 7;

Fig. 9 is a view similar to Figs. 4 and 6, illustrating a still further modification of the collector mechanism;

Fig. 10 is an end elevation showing details of the flights of the collector shown in Fig. 9, and Fig. 11 is a fragmentary front elevation of the flight shown in Fig. 10.

Referring to the drawings, the apparatus illustrated comprises a main tank 1 having four independent longitudinal sludge chambers, 2, 3, 4 and 5, respectively. Sewage is fed to these chambers from a common influent channel 6 and through independent branch channels 7 connecting with the channel 6. The sludge-free liquid is collected and drawn off from the various chambers through a common effluent channel 8 at the opposite end of the tank structure from the influent channel 6. In that the individual chambers and the associated apparatus are identical, further description will be confined for the sake of brevity to a single chamber.

The tank chamber, the length of which preferably is from three to five times its width, has at its influent end one or more hoppers 9 extending below the floor level of the major portion of the tank, the hoppers in the present instance numbering two and being separated by a wall 10 tapered at the top and with its upper edge substantially on a line with the floor level of the major portion of the tank. The hoppers 9, 9 constitute the sump in which the sludge is collected in a manner hereinafter described and from which it may be drawn through pipes 11 extending to the bottom of the hoppers, as illustrated, and connected through the wall of the tank with a pipe line 12 extending to suitable pumping apparatus (not shown).

The sewage is admitted to the tanks from the channels 7 through submerged pipes 13, there being two of these pipes for each chamber, in the present instance, located respectively above the hoppers 9, as shown in Fig. 3. The pipes 13 discharge horizontally, as indicated in Fig. 2, so that the influent substance is projected against the wall of the tank. A large part of the suspended solids in the liquid entering the tank settles immediately into the hoppers 9, the remainder being carried towards the effluent end and settling out to the bottom of the major portion of the tank, leaving a clear liquid eventually which discharges over a weir 14 into the effluent channel 8 at the opposite end of the tank. The weir preferably is vertically adjustable.

In order to eliminate the sludge which collects in the bottom of the tank, I provide a submerged sludge collector mechanism, which consists in a preferred form of two endless strands of chain 15 and 16 which operate upon a series of sprockets 17, as shown in Fig. 2. These sprockets are carried respectively upon a head shaft 18, a foot shaft 19, and upper and lower turn shafts 20 and 21 respectively. The shaft 18 is connected through a chain 22 with a countershaft 23, and this countershaft is connected by suitable gearing with a motor 24 which constitutes the prime mover for the chains 15 and 16. The chains are connected at predetermined intervals with cross pieces or flights 25 which project from the outer sides of the chains, and the foot shaft 19 and turn shaft 21 are so mounted in the tank that these flights wipe the bottom of the tank, as clearly illustrated. The flights 25 may be made of any suitable material such as steel or wood.

In the top of the tank are mounted rails 26, these being supported in the present instance on transverse beams 27, these rails being adapted to support and guide the upper run of the chains at a predetermined level in the tank. This level corresponds closely to the normal liquid level so that the flights 25 are only partially submerged in the top run of the chains. The chains move in the direction indicated by the arrows in Fig. 2, and in the lower run of the chains, the flights 25 function to sweep the precipitated sludge from the tank into the sump. In the arrangement described, the flights 25 are utilized in the upper or return run of the chains to collect the scum, grease and oil at the surface of the liquid and to carry it into a scum trough 28 at the effluent end of the tank, the scum being conducted away or withdrawn from the trough in suitable manner.

It is essential that all of the settled sludge be removed from the tank, and as it is difficult to finish concrete to give accurately smooth surfaces, I provide means in the collectors to compensate for unevenness in the masonry and to compensate also for wear in the flights or scrapers. This means I have illustrated in Figs. 4 to 11, inclusive. In the embodiment shown in Figs. 4 and 5, the flights are carried by arms 29 which are pivotally secured to the carrying links 30 of the chains. With this arrangement, when the flight travels over the upper turn shaft 20, it drops forward until it comes into contact with the bottom wall of the tank. In order to make the action of the flights embrasive of the entire length of the tank, the corner where the bottom of the tank joins the front wall is rounded out, as indicated at 31, and as shown in Fig. 4, the curve 31 is so related to the shaft 19 that the flight comes into contact with the surface of the tank at the top of this curved corner. This prevents accumulations at the corner which would prevent a thorough cleaning action of the flights and which might tend to clog the apparatus.

In the embodiment shown in Figs. 4 and 5, the arm 29 is provided with a stop 32 which by engagement of the link 30 positively limits the downward movement of the flight and prevents jamming.

Another embodiment of the device is shown in Figs. 6, 7 and 8. In this instance, the flight 25 is slidably mounted in a bracket 33 secured to the carrying link 34. Also pivoted on the link 34 is a lever 35, one arm of which is weighted at 36, while the other arm 37 engages the inner edge of the flight. The arrangement is such that when the flight passes over the shaft 20, the arm 37 is brought by the action of the weight 36 against the inner edge of the flight 25 and tends to force the latter outwardly on the supporting bracket 33. The lever 35 functions during the downward movement of the flight around the curved corner 31, but during the major portion of the rearward run of the flight, it is held resiliently in contact with the bottom of the tank by its own weight.

A somewhat similar arrangement is shown in Figs. 9, 10 and 11. In this instance also, the flight 25 is slidably mounted on an arm 38 on the carrying link 39, but a spring 40 replaces the weighted arm 35 and functions after the manner of said weight to resiliently hold the flight in an extended position on the brackets 38.

In each of the aforedescribed devices, it will be noted that the flight resiliently or flexibly engages the surface of the tank whereby irregularities and unevenness in the said surface are fully compensated.

By reference to Fig. 2, it will be noted that at the inner edge of the hopper 9, overhanging rails 41 are provided which form an extension of the track in the bottom of the main portion of the tank, projecting over the forward edges of the hopper and beyond the centre line of the lower turn shaft. These overhanging tracks prevent a sudden drop of the pivoted flights. Such a drop will agitate the settled solids and cause a portion of them to go again into suspension.

It will be obvious that there may be much modification in the detail structure of the tanks and of the collector apparatus without departure from the essential features of the invention.

I claim:

1. The combination with a settling tank having a substantially vertical end wall and where the bottom joins the said wall a rounded corner, of sludge removing means at the opposite end of the tank, an endless conveyer having rigid transverse flights adapted to sweep the accumulated sludge in the bottom of the tank to said removing means, and means affording free movement of the flights away from the conveyer and into engagement with the said rounded corner and the bottom of the tank to thereby effect a substantially complete removal of the said sludge from the tank.

2. The combination with a settling tank having a substantially vertical end wall and where the bottom joins the said wall a rounded corner, of sludge removing means at the opposite end of the tank, an endless conveyer having rigid transverse flights adapted to sweep the accumulated sludge in the bottom of the tank to said removing means, and arms supporting said flights and pivotally attached to the conveyer whereby the flights are freely movable by gravity into engagement with the said rounded corner and the bottom of the tank to thereby effect a substantially complete removal of the said sludge from the tank.

MARCUS B. TARK.